(12) United States Patent
Goncharov et al.

(10) Patent No.: US 9,902,021 B2
(45) Date of Patent: Feb. 27, 2018

(54) PRECIPITATION STRENGTHENED NICKEL BASED WELDING MATERIAL FOR FUSION WELDING OF SUPERALLOYS

(71) Applicant: Liburdi Engineering Limited, Dundas (CA)

(72) Inventors: Alexander B. Goncharov, Toronto (CA); Joseph Liburdi, Dundas (CA); Paul Lowden, Cambridge (CA)

(73) Assignee: Liburdi Engineering Limited (CA)

( * ) Notice: Subject to any disclaimer, the term of this patent is extended or adjusted under 35 U.S.C. 154(b) by 265 days.

(21) Appl. No.: 14/800,045

(22) Filed: Jul. 15, 2015

(65) Prior Publication Data

US 2015/0314399 A1    Nov. 5, 2015

Related U.S. Application Data

(63) Continuation of application No. PCT/CA2013/001075, filed on Dec. 24, 2013.

(51) Int. Cl.
| | |
|---|---|
| *B23K 35/30* | (2006.01) |
| *C22F 1/10* | (2006.01) |
| *C22C 19/05* | (2006.01) |
| *B23P 6/00* | (2006.01) |
| *B23K 35/24* | (2006.01) |
| *B23K 35/02* | (2006.01) |

(52) U.S. Cl.
CPC ........ *B23K 35/304* (2013.01); *B23K 35/0222* (2013.01); *B23K 35/0227* (2013.01); *B23K 35/0255* (2013.01); *B23K 35/0261* (2013.01); *B23K 35/24* (2013.01); *B23K 35/30* (2013.01); *B23K 35/3033* (2013.01); *B23P 6/00* (2013.01); *C22C 19/05* (2013.01); *C22C 19/056* (2013.01); *C22C 19/057* (2013.01); *C22F 1/10* (2013.01)

(58) Field of Classification Search
CPC .... C22C 19/055; C22C 19/056; C22C 19/057
See application file for complete search history.

(56) References Cited

U.S. PATENT DOCUMENTS

| | | | | |
|---|---|---|---|---|
| 5,897,801 A | * | 4/1999 | Smashey | B23K 9/0026 |
| | | | | 148/524 |
| 2004/0109786 A1 | * | 6/2004 | O'Hara | C22C 19/056 |
| | | | | 420/444 |

* cited by examiner

*Primary Examiner* — Jessee R Roe
(74) *Attorney, Agent, or Firm* — Ridout & Maybee LLP; Mark A. Koch

(57) ABSTRACT

A precipitation strengthened nickel based welding material that comprises 5-15 wt. % Co, 5-25 wt. % Cr, 1-6 wt. % Al, 0.05-0.2 wt. % C, 0.015-0.4 wt. % B, 1-3 wt. % Si, chemical elements selected from among tungsten and molybdenum from about 1 to 20 wt. %, chemical elements selected from among titanium, zirconium, hafnium, tantalum and rhenium from about 1 to 18 wt. % and nickel with impurities to balance, wherein the boron content is inversely proportional to silicon content and decreases from about 0.3 wt. % to about 0.015 wt. % when silicon content increases from about 1 wt. % to about 3 wt. % produces sound high strength and high oxidation resistance crack free welds on precipitation strengthened superalloys and single crystal materials.

2 Claims, 12 Drawing Sheets

PRECIPITATION STRENGTHENED NICKEL BASED WELDING MATERIAL FOR FUSION WELDING OF SUPERALLOYS

This application is a continuation of prior international application No. PCT/CA2013/001075, filed Dec. 24, 2013, under the title, "PRECIPITATION STRENGTHENED NICKEL BASED WELDING MATERIAL FOR FUSION WELDING OF SUPERALLOYS," having a first inventor Alexander B. Goncharov.

The invented material in a form of welding wire and powder can be used for fusing welding including laser beam (LBW), plasma (PW), microplasma (MPW), electron beam (EBW) and Gas Tungsten Arc Welding (GTAW) of precipitation strengthening nickel and cobalt based superalloys.

The precipitation strengthening nickel based superalloy comprised of: 5-15 wt. % Co, 13-15.6 wt. % Cr, 2.5-5 wt. % Mo, 3-6 wt. % W, 4-6 wt. % Ti, 2-4 wt. % Al, 0.15-0.3 wt. % C, 0.005-0.02 wt. % B, up to 0.1 wt. % Zr and nickel with impurities to balance as per U.S. Pat. No. 3,615,376 has been widely used for turbine engine applications for decades. This superalloy has a good combination of mechanical properties, oxidation resistance up to 1742° F. and weldability. The embodiment of this alloy also known as René 80 superalloy is comprised of: 9.5 wt. % Co, 14 wt. % Cr, 4 wt. % Mo, 4 wt. % W, 5 wt. % Ti, 3 wt. % Al, 0.17 wt. % C, 0.015 wt. % B, 0.03 wt. % Zr and nickel to balance in a form of welding wire and powder has been used for welding of Inconel 738, GTD 111, GTD 222, René 77 polycrystalline and CMSX-4, René N5 and other single crystal materials. Welding of precipitation strengthened nickel based superalloys with high content of gamma prime phase results in a severe heat affected zone (HAZ) liquation cracking. The susceptibility of Inconel 738 superalloy to liquation cracking is aggravated by solidification and thermal stresses making it almost impossible to produce crack free welds at an ambient temperature using known welding materials, refer to M. Montazeri, F. Malek Ghaini and O. A. Ojo in the article "Heat Input and the Liquation Cracking of Laser Welded IN738LC Superalloy", Welding Journal, 2013, Vo. 92, 2013, pp.: 258-264.

To produce sound crack free welds engine components manufactured of Inconel 738, GTD 111 and other high gamma prime superalloys should be preheated prior to welding to high temperatures as per U.S. Pat. No. 5,897,801 and U.S. Pat. No. 6,659,332. However, preheating reduces productivity, increases cost and affects health and safety conditions.

In addition to the above, after weld repair turbine blades are prone to accelerated oxidation that increases clearance between turbine blades and stator assembly reducing efficiency and increasing fuel consumption and emission of green house gases.

To increase the oxidation resistance of welds the rhenium bearing René 142 welding wire that is comprised of: 10-13 wt. % Co, 3-10 wt. % Cr, 0.5-2 wt. % Mo, 3-7 wt. % W, 0.5-10 wt. % Re, 5-6 wt. % Al, 5-7 wt. % Ta, 0.5-2 wt. % Hf, 0.01-0.15 wt. % C, 0.005-0.05 wt. % B, 0-0.1 wt. % Zr with nickel to balance as per U.S. Pat. No. 4,169,742, was introduced to the industry. However, due to a high cost of rhenium René 142 welding wire is extremely expensive. Also, the quality of welds produced using René 142 welding wire is even more sensitive to a preheating temperature than René 80 due to a higher susceptibility of René 142 alloy to cracking.

To prevent HAZ cracking either residual stress should be minimized by preheating of engine components to high temperature as discussed in U.S. Pat. No. 5,897,801 and U.S. Pat. No. 6,659,332 or the melting temperature of welding materials be reduced to prevent overheating of HAZ by additional alloying of welding materials using melting point depressants, such as boron, as per US RE 29920 and RE 2868. These nickel based alloys comprise of: 0.05-0.3 wt. % B, up to 0.35 wt. % C from 5 to 22 wt. % Cr, up to 8 wt. % and up to 3 wt. % Nb respectively with nickel to balance.

However, as it was found by experiments, boron in amounts up to 0.3 wt. % does not prevent HAZ microfissuring of Inconel 738, GTD 111 and Mar M247 superalloys during welding at an ambient temperature. In addition to the above, boron significantly reduces oxidation resistance of welds.

Silicon is another well known melting point depressant. Si has been used for manufacturing of welding wire such as Haynes HR-160 (UNS Number N12160) that comprises of: Ni—29 wt. % Co—28 wt. % Cr—2 wt. % Fe—2.75 wt. % Si—0.5 wt. % Mn—0.5 wt. % Ti—0.05 wt. % C—1 wt. % W—1 wt. % Mo—1 wt. % Nb. Welds produced using Haynes HR-160 welding wire have a superior oxidation resistance. However, mechanical properties of these welds at temperatures exceeding 1800° F. are extremely low. As a result, silicon has not been considered for manufacturing of nickel based superalloys due to harmful effects on mechanical properties of nickel based superalloys.

For example, as per Robert V. Miner, Jr. addition of 0.5 and 1 wt. % Si to nickel based Inconel 713C and Mar M200 superalloys drastically affected high temperature mechanical properties of these alloys, refer to Robert V. Miner, Jr. "Effect of Silicon on the Oxidation, Hot-Corrosion, and Mechanical Behaviour of Two Cast Nickel-Base Superalloys", Metallurgical Transactions, Volume 8A, December 1977, and pp. 1949-1954. Furthermore, this degradation could not be explained by obvious changes of either the phase compassion or morphologies of precipitancies and their reaction with other alloying elements and Ni at high temperatures.

As a result, Si has been used mostly for manufacturing of high temperature cobalt and nickel based brazing materials such as AMS4775, which includes 3.1 wt. % B and 4 wt. % Si, AMS4777 that is comprised of: 3.1 wt. % B and 4.5% Si, AMS 4779 with 1.85 wt. % B and 3.5 wt. % Si, Amdry 788 with 2 wt. % B and 2 wt. % Si, as well as special nickel based alloy disclosed in U.S. Pat. No. 2,868,667 that is comprised of: 2.5-4.5 wt. % B and 3.5-5.5 wt. % Si.

Joints produced using brazing alloys described in the prior art are free of cracks due to the nature of high temperature brazing process, which is carried out with isothermal heating of parts in vacuum furnaces, that minimizes residual stresses. However, mechanical properties of brazed joints are significantly lower than base materials. It significantly limits the use of brazing for manufacturing and repair of highly stressed rotating and structural components of turbine engines.

Therefore, there are substantial industrial needs in the development of new high oxidation resistance, high strength and ductility welding materials based on gamma prime nickel superalloys that can produce crack free welds on precipitation hardening superalloys at an ambient temperature.

BRIEF DESCRIPTION OF THE INVENTION

We have found that a precipitation strengthened nickel based welding material that comprises of: 5-15 wt. % Co, 5-25 wt. % Cr, 1-6 wt. % Al, 0.05-0.2 wt. % C, 0.015-0.4 wt. % B, 1-3 wt. % Si, and chemical elements selected from among tungsten and molybdenum from about 1 to 20 wt. %, and chemical elements selected from among titanium, zirconium, hafnium, tantalum and rhenium from about 1 to 18 wt. % and nickel and impurities to balance in the form of welding wire and powder produces sound high strength and high oxidation resistance crack free welds on precipitation hardening superalloys and single crystal materials.

The advantages of the developed welding material are as follows: Firstly it enables fusion welding of Inconel 738, GTD 111, Mar M002, Mar M277 and other high gamma prime nickel based polycrystalline superalloys without HAZ cracking at an ambient temperature. Secondly, it produces crack free welds with a unique combination of high strength and high oxidation resistance on Inconel 738, GTD 111, Mar M002, Mar M277 and other high gamma prime nickel based polycrystalline superalloys. Thirdly it minimizes or eliminates recrystallization of single crystal materials in the HAZ along the fusion line.

In another preferable embodiment the welding material comprises of 8-10 wt. % Co, 14-18 wt. % Cr, 3-5 wt. % Mo, 3-5 wt. % W, 3-6 wt. % Ti, 0.04-0.06 wt. % Zr, 2-4 wt. % Al, 0.05-0.1 wt. % C, 0.1-0.35 wt. % B, 1-3 wt. %, Si and nickel with impurities to balance.

The preferable and most advanced embodiment of the welding material for the welding of engine components exposed to extremely high temperature, stresses and hot corrosion is comprised of 11-13 wt. % Co, 6-8 wt. % Cr, 1-3 wt. % Mo, 4-6 wt. % W, 0.01-0.03 wt. % Zr, 5-7 wt. % Al, 0.1-0.15 wt. % C, 1-3 wt. % Re, 5-7 wt. % Ta, 0.015-0.3 wt. % B, 1.2-1.8 wt. % Si and nickel with impurities to balance.

In another preferable embodiment the content of boron is reduced proportionately from about 0.4 wt. % to about 0.1 wt. % with proportionate increase of the silicon content from about 1 wt. % to about 3 wt. % such that the total boron and silicon content ranges from about 1.4 wt. % to about 3.1 wt. % allowing to enhance either mechanical properties or oxidation resistance of welds as necessary for a particular application avoiding at the same time HAZ cracking of polycrystalline superalloys and recrystallization of single crystal materials.

Preferable embodiments are welding wire or welding powder or repaired using the wire or powder parts of the turbine engine components.

STANDARD ACROMYMS

Figure 1:
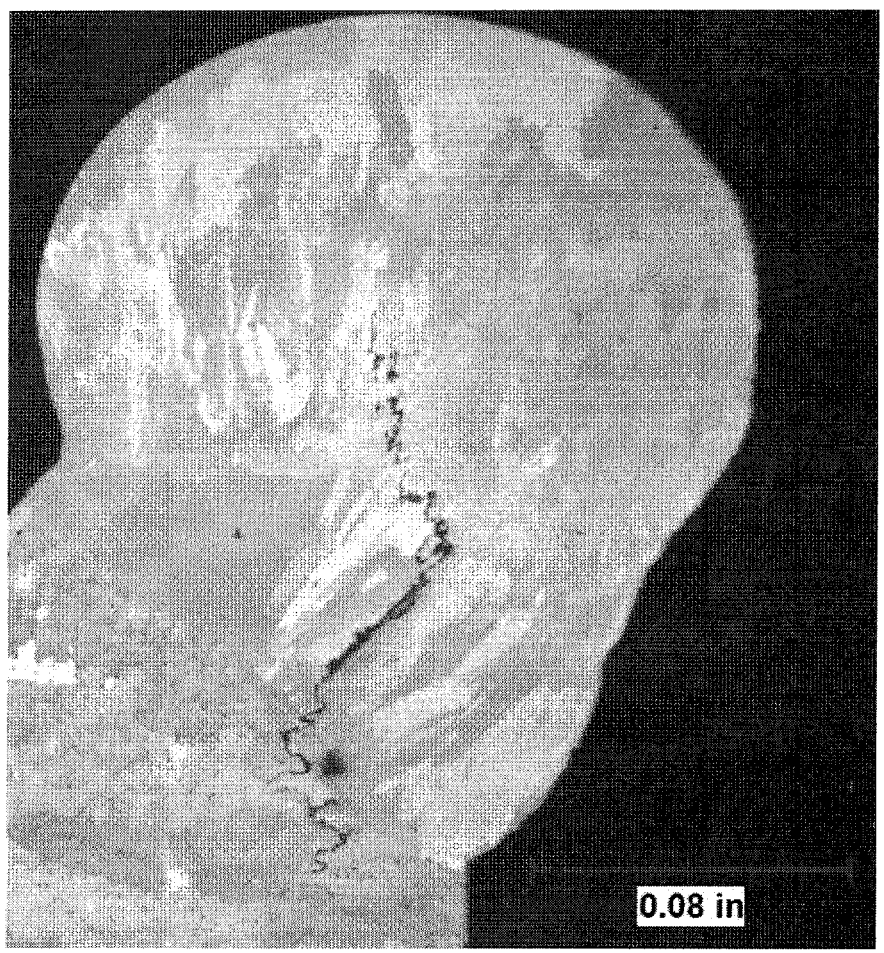
FIG. 1 is the micrograph of the clad weld produced using standard René 80 on GTD 111 superalloy in annealed condition that depicts HAZ and weld cracking.
Figure 2:
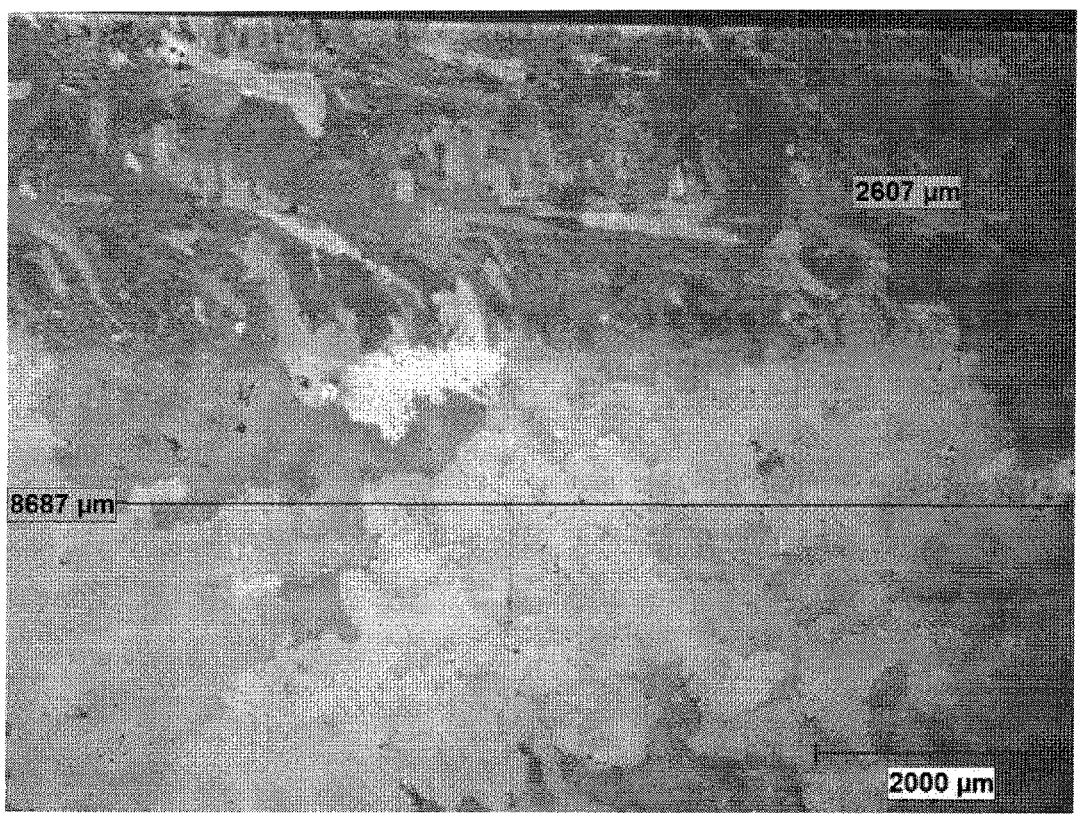
FIG. 2 is the micrograph of a longitudinal section of a laser clad weld on GTD 111 superalloy in annealed condition produced using Welding Material FM4 in a form of powder that depicts crack free weld and HAZ.
Figure 3:
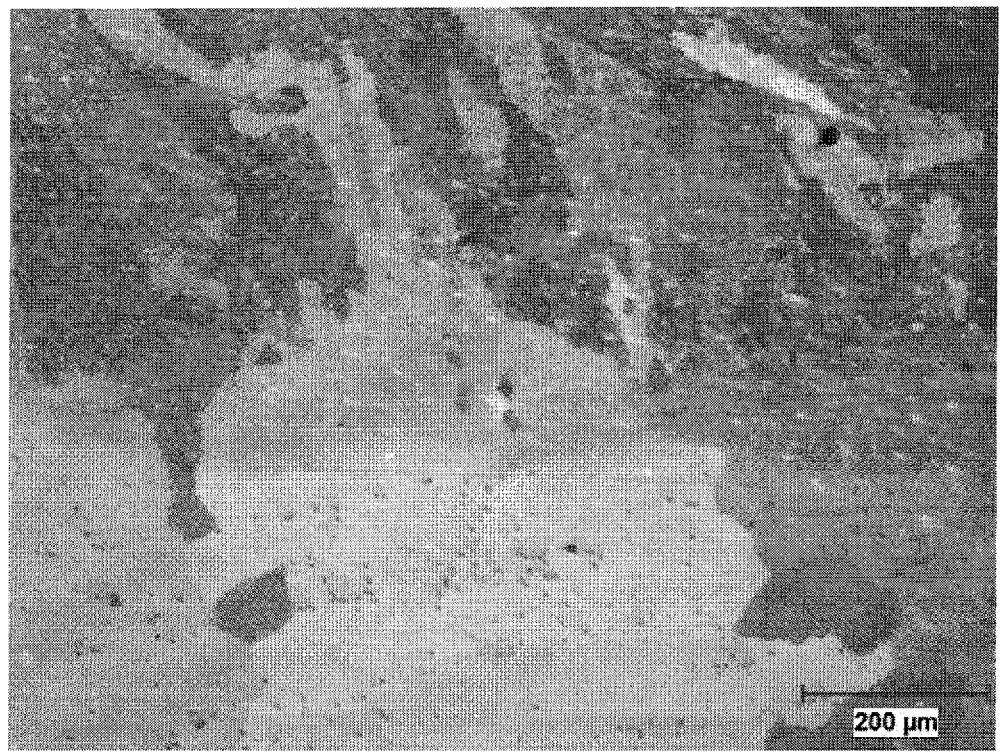
FIG. 3 is the micrograph of a fusion zone of a laser clad weld produced using Welding Material FM3 in the form of powder on IN738 superalloy in aged heat treated condition depicts crack free weld and HAZ.
Figure 4:
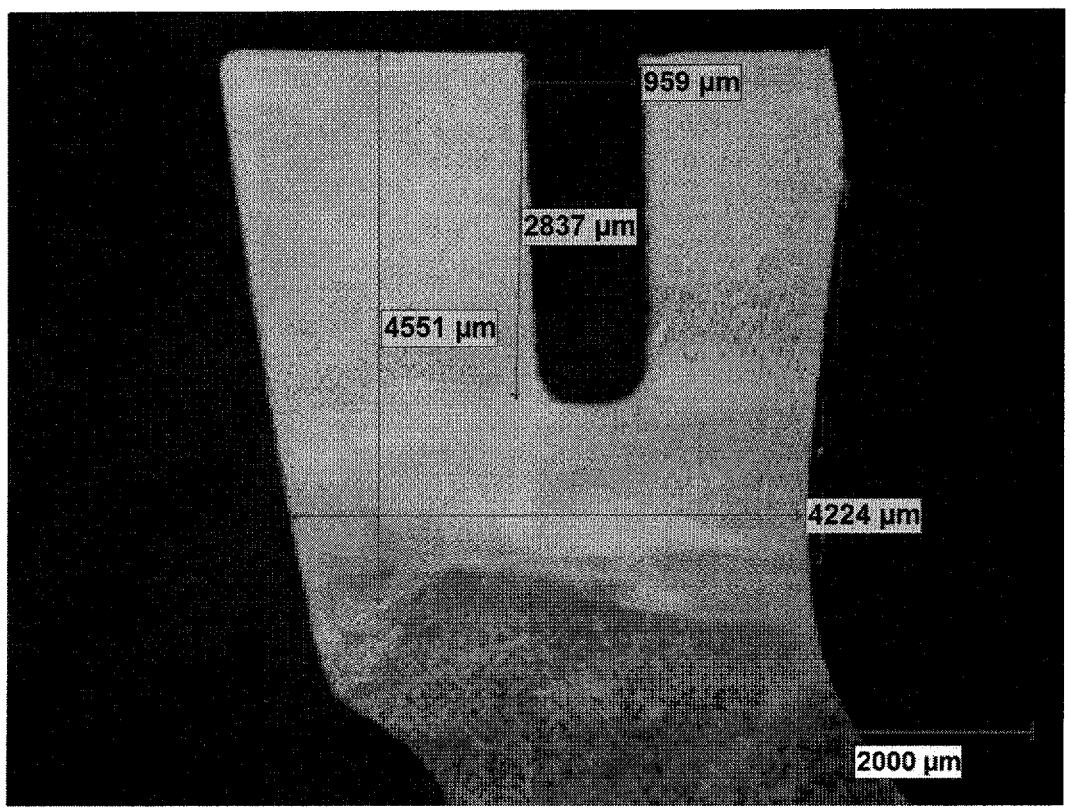
FIG. 4 is the micrograph of the GTAW-MA clad weld produced using Welding Material FM3 in a form of a welding wire on the Nozzle Guide Vain manufactured of Mar M247 superalloy in post weld aged heat treated condition that depicts crack free weld and HAZ.

AMS—Aerospace Material Specification (standards)
ASTM—American Society for Testing and Materials (standards)
AWS—American Welding Society (standards)
HAZ—Heat Affected Zone
HPT—High Pressure Turbine
IGT—Industrial Gas Turbine Engines
LPT—Nozzle Gide Vane
NDT—Non Destructive Testing
NGV—Nozzle Gide Vane
OEM—Original Equipment Manufacture
PWHT—Post Weld Heat Treatment
UNS—Unified Numbering System is an alloy designation system widely accepted in North America
UTS—Ultimate Tensile Strength Glossary Alloys—metal compounds consisting of a mixture of two or more materials.
Austenite—a solid solution of one or more elements in the face-centered cubic phase.

Base Metal or Material—one of the two or more metals to be welded together to form a joint.

Borides—compounds consisting of two elements of which boron is the more electronegative one. Boron form borides with metal and non-metal elements.

Carbides—compounds composed of carbon and a less electronegative element. Carbon can produce carbides with metals (such as chromium, niobium, molybdenum, tantalum, titanium, tungsten, and other metals of IVB, VB and VIB groups) and non-metal (such as boron, calcium, or silicon). Metal carbides are characterized by their extreme hardness and resistance to high temperatures.

Cladding—the process of the application of a relatively thick layer (>0.5 mm (0.02 in.)) of welding material and/or composite welding powder for the purpose of improved wear and/or corrosion resistance or other properties and/or to restore the part to required dimensions with minimum penetration into the base material.

Cold Rolling—a process that carried out at a temperature below of the recrystallization temperature of alloy.

Cold Working—shaping of metal at temperatures substantially below the point of recrystallization. Cold working adds strength and hardness.

Crack—fracture-type discontinuity that is characterized by a sharp tip and high ratio of length to width, usually exceeding three (3).

Cracking—fracture that develops in the weld during or after solidification of a welding pool is completed.

Creep (properties)—is the tendency of a solid material to move slowly or deform permanently under the influence of stresses. Creep occurs when a metal is subjected to a constant tensile load at an elevated temperature.

The Creep and Rupture Tests—are tests that carried out by applying a constant load to a tensile specimen maintained at a constant temperature according to ASTM E139. The rupture test in carried out in a similar manner to the creep test but at a higher stress level until the specimen fails and the time at failure is measured. Time prior to rupture at given loading is used to characterize rupture properties of materials.

Dilution—the change in a chemical composition of a welding material caused by the admixture of the base material or previous weld metal in the weld bead that is measured by the percentage of the base metal or previous weld metal in the weld bead.

Discontinuity—an interruption of the typical structure of a weld metal, such as a lack of homogeneity in the mechanical, metallurgical or physical characteristics of the base or weld metal.

Ductility—ability of metals and alloys to be drawn, stretched, or formed without breaking.

Extrusion—a process of shaping by forcing a rod stock through a single die or series of dies.

Fissuring—small crack-like discontinuities with only slight separation (opening displacement) of the fracture surfaces. The prefixes macro—or micro—indicate relative size.

Fusion Welding—the welding process that used fusion of the base metal to make the weld.

Gamma (γ) Phase—the continuous matrix (called gamma) is a face-centered-cubic (fcc) nickel-based austenitic phase that usually contains a high percentage of solid-solution elements such as Co, Cr, Mo, and W.

Gamma Prime (γ') Phase—the primary strengthening phase in nickel-based superalloys is a compound consisting of nickel and either aluminum or titanium Ni3Al or Ni3Ti that coherently precipitates in the austenitic γ matrix.

Gas Atomization—the process to manufacture high quality metal powders by forcing a molten metal stream through an orifice and atomizing it by inert gas jets into fine metal droplets followed by rapid cooling.

Gas Tungsten Arc Welding (GTAW)—in accordance with the AWS definition it is the arc welding process that produces coalescence of metals by heating them with an arc between a tungsten (non-consumable) electrode and the work also know as a base material. Shielding is obtained from a gas or a gas mixture. Pressure may or may not be used and filler metal may or may not be used.

Hardness—ability of metals and alloys to resist indentation, penetration, and scratching.

Heat Affected Zone (HAZ)—the portion of the base metal that has not been melted, but whose mechanical properties or microstructure were altered by the heat of welding.

Heat Treatment—the controlled heating and cooling processes used to change the structure of a material and alter its physical and mechanical properties.

Hot Rolling—a process that carried out at a temperature exceeding the recrystallization temperature of alloy.

Induction Melting—a process in which an induced electrical current known also as Eddy Current heat and melt metals and alloys.

Inverse Proportion—is a relationship where a number either increases as another decreases or decreases as another increases. Inversely proportional is the opposite of directly proportional.

Laser Beam Welding and Cladding (LBW)—in accordance with AWS definition it is a welding process that produces coalescence of materials with the heat obtained from the application of concentrated coherent light beam impinging upon the joint or base material respectively.

Linear Discontinuities—weld defects with the ratio of a length to a with 3:1 or greater.

Liquation Crack—a crack in the weld that occurs during solidification and caused by the melting of low melting-point grain boundary constituents.

Multi Pass Cladding and Welding—a weld that is formed by two or more passes

Nickel based superalloys—materials whereby the content of nickel exceeds the content of other alloying elements.

Plasma Arc Welding (PAW)—in accordance with AWS definition it is an arc welding process that produces coalescence of metals by heating them with a constricted arc between an electrode and the workpiece (base metal) known also as transferred arc or the electrode and the constricting nozzle known also as non-transferred arc.

Precipitation Heat Treatment or Hardening—the process of heating of alloys to a temperature at which certain elements precipitate, forming a harder structure, and then cooling at a rate to prevent return to the original structure.

Recrystallization—is a formation of a new, strain-free grain structure from existing one that usually accompanied by grain growth during heat treatment.

Recrystallization temperature—is an approximate temperature at which recrystallization of an existing grain structure occurs within a specific time.

Rolling—a process in which metal stock is passed through a set of mechanically driven rolls.

Rupture Strength—is a nominal stress developed in a material at rupture, which in not necessarily is equal to ultimate strength.

Solidification Shrinkage—the volume contraction of a metal during solidification.

Solution Heat Treatment—the heat treatment method that is used to heat alloys to a specific temperature for a certain period of time allowing one or more alloying elements to dissolve in a solid solution and then cool rapidly.

Superalloys—metallic materials with oxidation resistance and mechanical properties for service at elevated temperatures.

Ultimate Tensile Strength (UTS)—the resistance of a material to longitudinal stress, measured by the minimum amount of longitudinal stress required to rupture the material.

Weld and Clad Bead—a localized coalescence of metal or non-metals produced either by heating the materials to the welding temperature, with or without the application of pressure, or by the application of pressure alone, with or without the use of welding material.

Weld Defects—discontinuities that by nature or accumulated effect render a part or product unable to meet minimum applicable acceptance standards or specifications.

Weld Pass—a single progression of a welding or cladding operation along a joint, weld deposit or substrate. The result of a pass is a weld bead, layer or spray deposit.

Weld Pool—the localized volume of molten metal in a weld prior to its solidification as weld metal.

Welding—the material joining processes used in making welds.

Welding Material—the material to be added in making a welded, brazed, or soldered joint Welding Powder—the welding material in a form of powder that is added in making of welded joints or clad welds.

Welding Wire—welding material in a form of wire that is added in making of welded joints or clad welds.

Yield Strength—the ability of a metal to tolerate gradual progressive force without permanent deformation

DETAILED DESCRIPTION OF THE INVENTION

The invented alloy can be used in the form of casting, wrought materials, plates, strips, sheets, powders and other welding materials. However, welding materials in the form of welding wire and powder are major applications.

Welding wire and powders are manufactured of ingots, which are also known as billets, produced in vacuum or argon using standard induction melting technologies and equipment or other melting processes.

For a manufacturing of welding wire billets are usually produced in the form of rods with a diameter exceeding 0.75 inch and reduced to a diameter of 0.50 inch by rolling or extrusion at a high temperature followed by standard surface finishing.

Nickel based alloys, in accordance with the present concept, are ductile at temperatures above 1600° F. During hot rolling rods with the initial diameter of 0.50 inch are reduced down to 0.020-0.062 inch. Rolling increases the yield strength and hardness of welding wires. Therefore, to increase ductility the welding wire is subjected to annealing heat treatment every so often to allow restoration of workability.

During final processing the welding wire is passed through a standard rigorous cleaning procedure that ensures the welds will be free from contamination.

Welding powders about of 45-75 μm in diameter are manufactured by standard gas atomization processes. During this process the melted superalloy with chemical composition as per the preferable embodiment is atomized by inert gas jets into fine metal droplets that cool down during their fall in the atomizing tower.

Metal powders obtained by gas-atomization have a perfectly spherical shape and high cleanliness level. Welding powder is used for plasma, microplasma and laser welding and cladding also known as fusion welding and cladding processes.

During fusion welding powder is fed into the welding pool with a jet of argon using standard powder feeders. After solidification welding powder is fused with the base material producing the weld metal. To reduce overheating and prevent HAZ cracking, welding and cladding are carried out with minimum dilution. The best results in cladding were achieved with a dilution of 5-15%.

Figure 7:
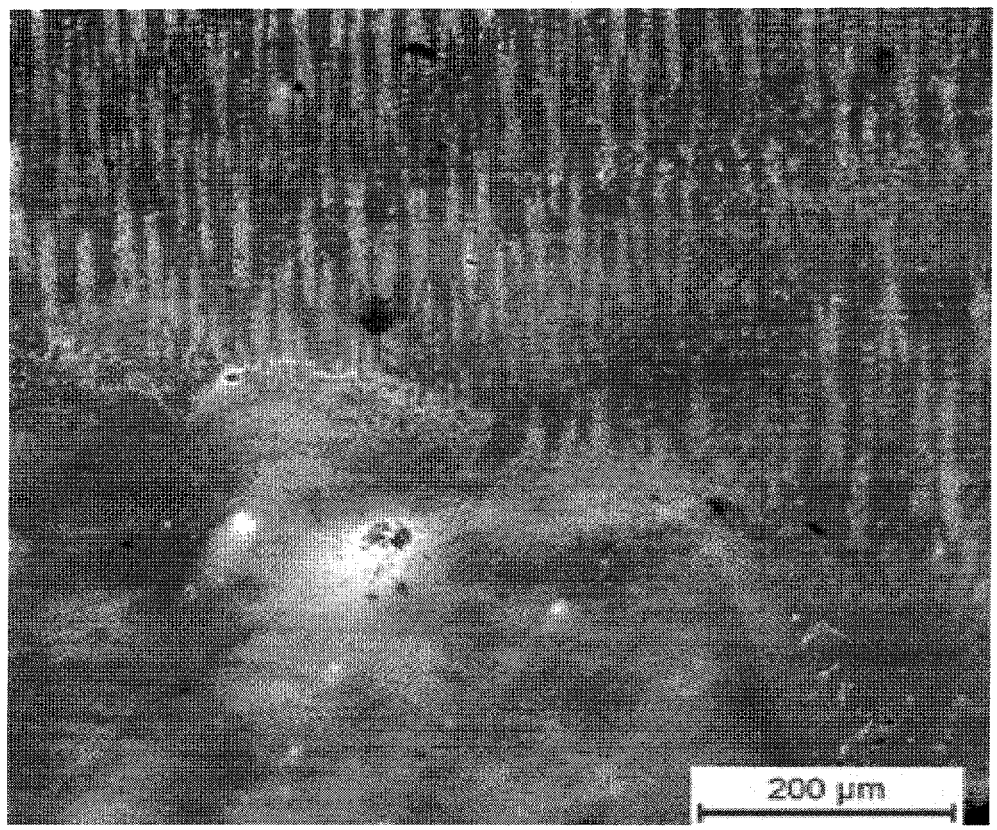
FIG. 7 is the micrograph of the GTAW-MA clad weld on single crystal material René N5 produced using Welding Material FM 7 in the form of welding wire that depicts crack free weld and HAZ without any evidence of recrystallization.
Figure 8:
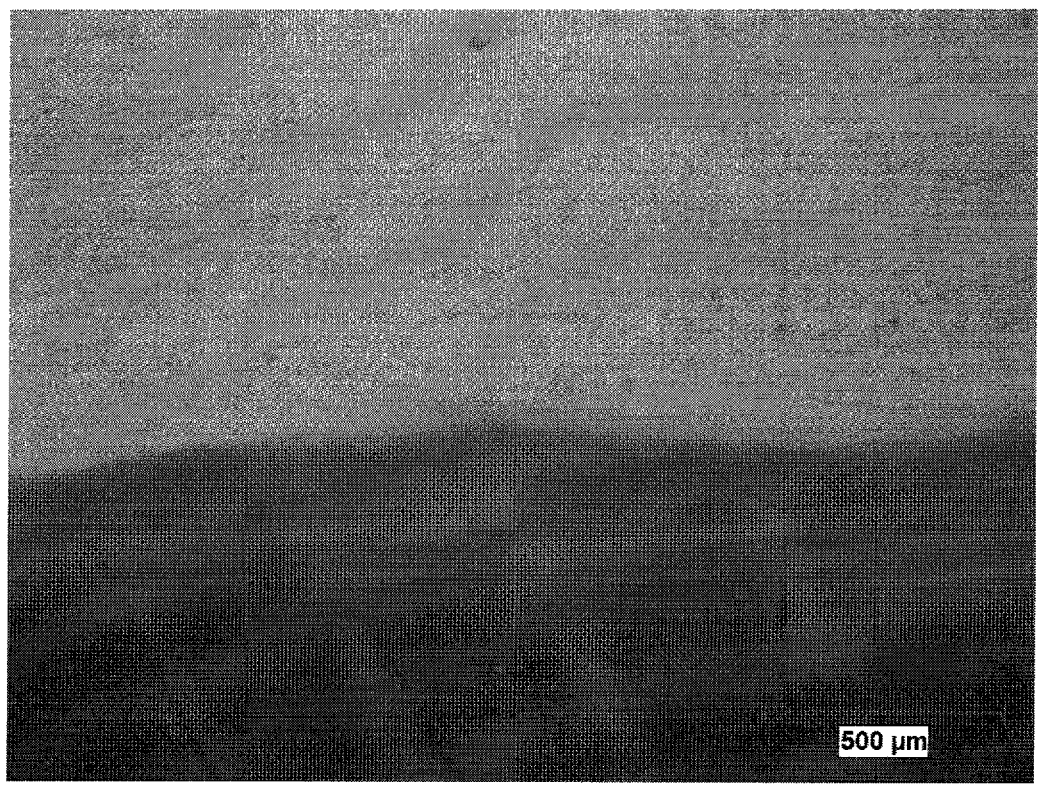
FIG. 8 is the micrograph of the GTAW-MA clad weld on single crystal CMSX-4 material produced using Welding Material FM9 that depicts crack free weld and HAZ without any evidence of recrystallization.

Boron and silicon combine with other alloying elements, which are disclosed in the preferable embodiment, as well as with the base material in the welding pool to produce the following beneficial effects:

First of all, boron and silicon as melting point depressants, reduce the temperature of the welding pool and overheating of the HAZ enhancing formation of sound crack free welds on Inconel 738, GTD111, Mar M002, Mar M247 superalloys as shown in FIG. 2 through 6 and eliminate recrystallization of CMSX-4 and René N5 single crystal materials as shown in FIGS. 7 and 8. The solidus temperature of these welds is much higher than brazing materials due to a low amount of boron and silicon but below the melting temperature of base materials. As a result, welds are able to maintain the required geometry during the PWHT at temperatures of about 2200° F., while brazed joints at this temperature are completely melted.

Figure 5:
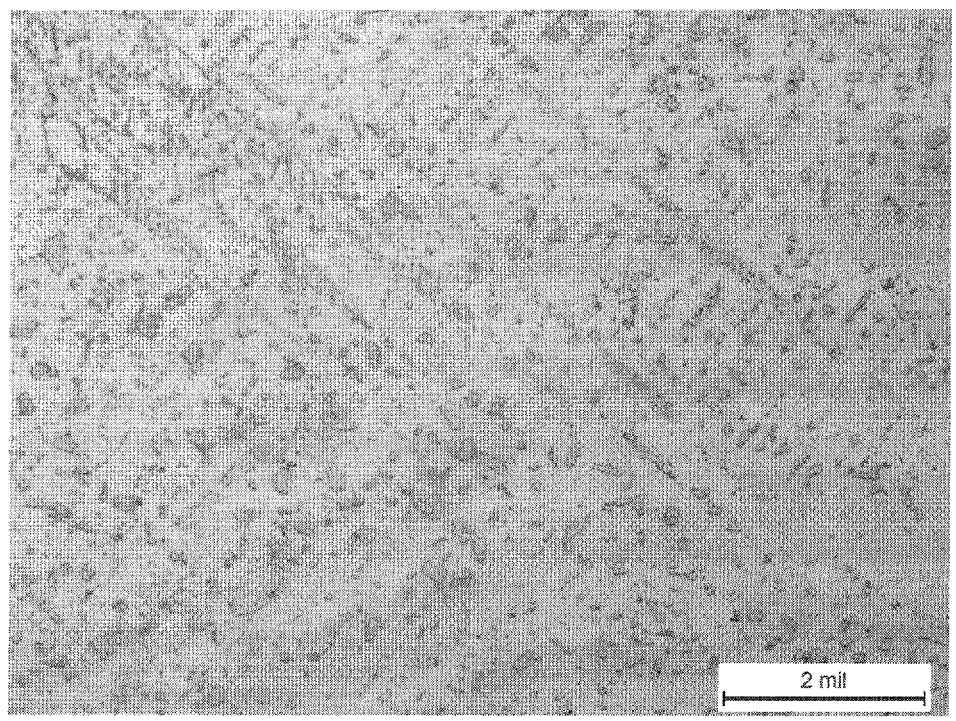
FIG. 5 is the micrograph of a laser clad weld produced using Welding Material FM8 in the form of powder on GTD 111 superalloy that depicts intergranular precipitation of borides and silicides.
Figure 6:
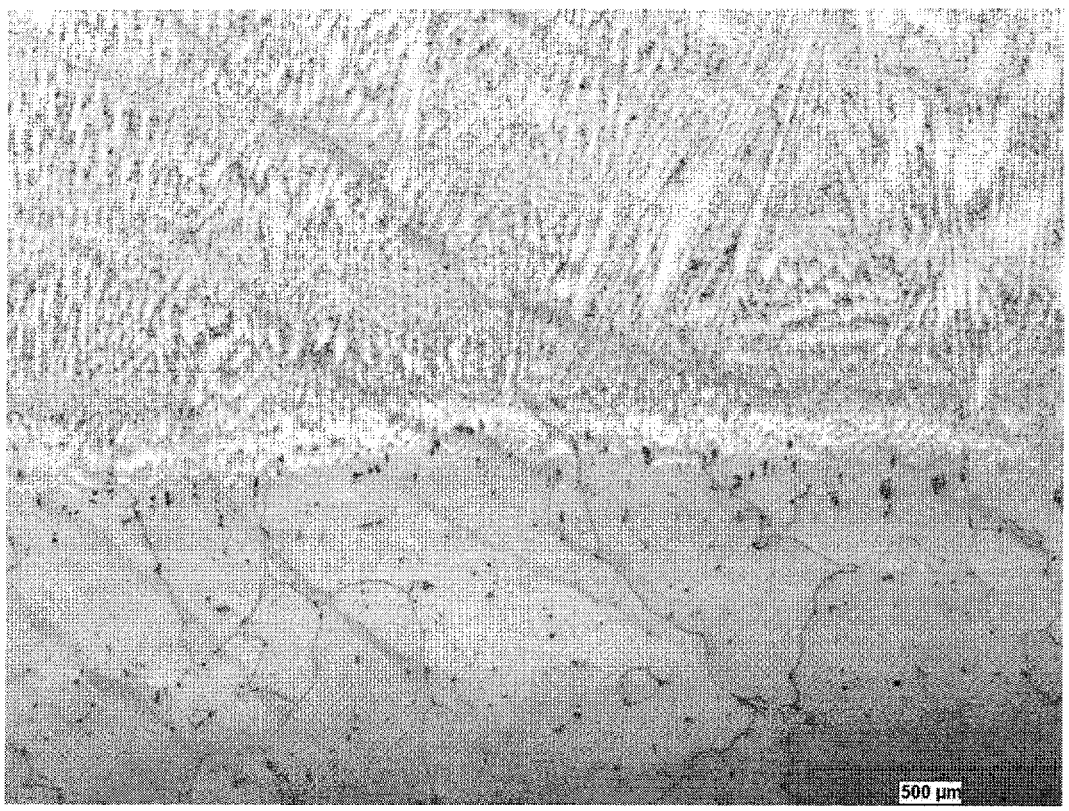
FIG. 6 is the micrograph of a GTAW-MA butt welded joint of René 77 produced using Welding Material FM8 in the form of a welding wire.
Figure 10:
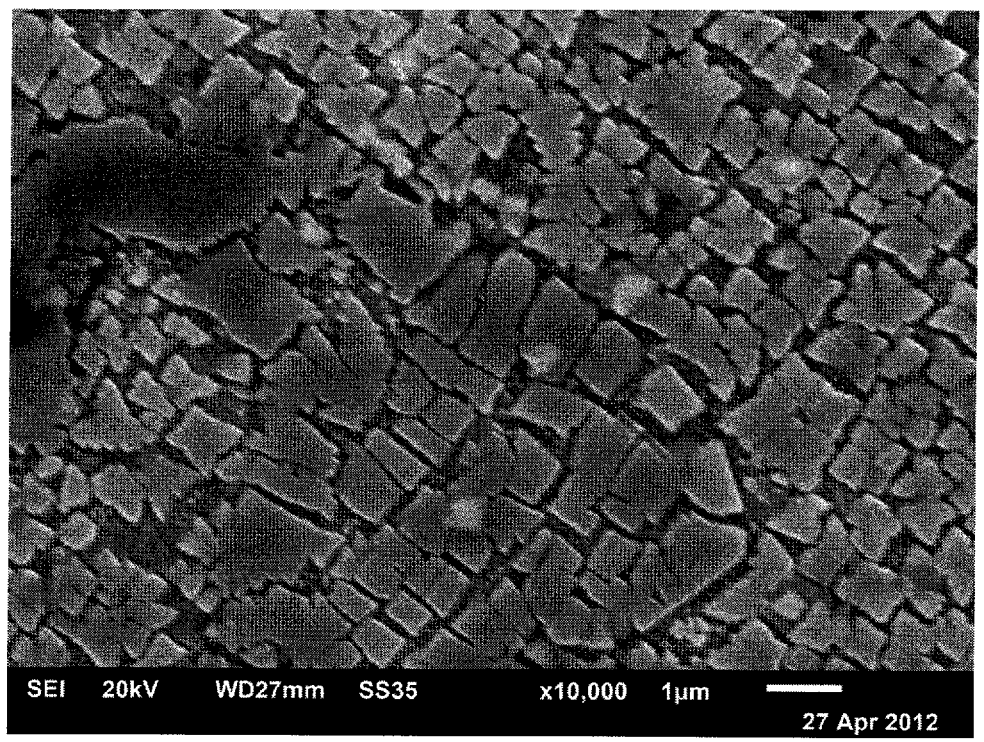
FIG. 10 is the micrograph of the weld metal produced using Welding Alloy FM8 in the form of a welding powder and laser beam welding on Inconel 738 superalloy in aged heat treat condition.

Secondly, boron prevents segregation and precipitation of continuous silicide films along grain boundaries enhancing precipitation of high strength cuboidal borides and silicides shown in FIG. 5 within grain matrix, which in combination with a formation of fine cuboidal gamma prime phase shown in FIG. 10, significantly improved high temperature mechanical properties of welds in comparison with welds produced using known welding materials.

And finally, silicon compensates for the damaging affect of boron on oxidation resistance and significantly improves oxidation resistance of welds even in comparison with welds produced using standard René 80 and René 142 welding materials as shown in Tables 4 and 5.

Examples of Welding of Inconel 738, GTD 111, Mar M002, Mar M247, CMSX-4 and Rene N5 Superalloys and Singel Crystal Materials Welding wires and powders with the chemical compositions as per preferable embodiments shown in Table 1 were manufactured using known methods to carry out welding experiments 1 through 16 and demonstration of the industrial applicability of the developed welding materials for a repair of HPT blades of aero and IGT engines.

Multi pass laser cladding was made on samples manufactured of Inconel 738, GTD 111, Mar M247, René 77 and Mar M002 polycrystalline superalloys and René N5 and CMSX-4 single crystal materials. These materials have been widely used for manufacturing of HPT and LPT turbine blades and NGV for industrial and aero turbine engines and therefore have a significant practical interest. Also, Inconel 738, GTD 111 and Mar M247 are extremely susceptible to the HAZ cracking during welding. René N5 and CMSX-4 single crystal materials are prone to a recrystallization in the HAZ that can result in cracking of turbine blades in service conditions.

Laser clad welds on Inconel 738 and GTD 111 superalloys were made using invented welding materials (FM) in the form of powders shown in Table 3 and standard René 80 welding powder for comparison of susceptibility of welds to cracking.

Butt joints of Inconel 738, GTD 111 and Mar M002 of 0.5" in thickness and clad welds on Mar M247 superalloy were produced using multi pass GTAW-MA welding with welding wires of 0.030 and 0.045 inch in diameters manufactured of Welding Material FM2 and FM5 and standard René 80 wire for comparison following up standard welding procedure for aerospace applications AMW 2685. To control dilution welding current was restricted to 100 A for butt welding and 60 A for cladding at an arc voltage about 12-14 V.

To produce multi pass laser clad welds of 0.10-0.24 inch in width, 0.12-5 inch in height and 2-6 inch in length the laser head was oscillated during welding with the amplitude of ±(0.03-0.07) inch and speed of about 30 inch/min at welding speed of 3-5 inch/min. Laser beam power was varied from 400 to 420 W and powder feed rate from 3 to 7 g/min.

Prior to welding samples manufactured of Inconel 738, GTD 111, Mar M247 and René 77 precipitation strengthening superalloys were subjected to a standard pre-weld annealing heat treatment at a temperature of 2190±15° F. for two (2) hours followed by an argon quench to improve weldability.

After welding all samples manufactured of Inconel 738 and GTD 111 superalloys were subjected to the PWHT comprised annealing at a temperature of 2190° F. for two (2) hours followed by a primary aging at temperatures of 2050° F. for two (2) hours and followed by secondary aging at a temperature of 1555° F. for twenty four (24) hours.

Weld samples manufactured of Mar M247 and Mar M002 superalloys were subjected to standard PWHT comprised secondary aging at a temperature of 1975° F. for two hours four (4) hours followed by a secondary aging at a temperature of 1560° F. for twenty (20) hours.

Samples manufactured of single crystal CMSX-4 and René N5 materials were stress relieved at a temperature of 2050° F. for two (2) hours.

Prior to mechanical testing weld samples were subjected to fluoro penetrant (FPI) as per ASTM E1209-05 and radiographic inspection as per ASTM E1742-08. No cracks and other weld discontinuities exceeding 0.002 inch in size were permitted.

Clad weld metal and butt weld joints were subjected to tensile testing as per ASRM E21 and rupture testing as per ASTM E139. Test results and parameters for rupture tests are shown in Tables 2 and 3 respectively.

The cyclic oxidation testing of samples of 0.25" in diameter and 1.0 inch in length was made at a temperature of 1825±15° F., which correspond to the maximum permitted Exhaust Gases Temperature (EGT) of turbine engines, for 20 hours followed by cooling for four (4) hours to a total test time at a maximum temperature of 820 hours.

The accelerated cyclic oxidation testing was made by heating of flat samples of 0.060 inch in thickness machined to surface roughness of 32 microns in air to a temperature of 2012±15° F. followed by one (1) hour soaking at this temperature and rapid cooling to an ambient temperature in air.

We are seeking to achieve the below four characteristics for the manufacture and repair of precipitation strengthening nickel based welding materials manufactured from the preferable embodiments:

1. Crack free welds on Inconel 738, GTD 111, Mar M247, René 77, Mar M002 and similar precipitation strengthened superalloys at an ambient temperature.
2. Exclude recrystallization and cracking of HAZ of CMSX-4, René N5 and other single crystal materials.
3. Achieve a minimum 0.2% Offset Yield Strength of 25 KSI at a temperature of 1800° F. and withstanding minimum 10 hours at stresses of 15 KSI at a temperature of 1800° F.
4. Produce superior than René 80 oxidation resistance at a temperature of 1825±15° F. and test during minimum of 500 hours.

Welding materials with lower level of mechanical and oxidation properties and ability to produce crack free welds manufactured as per the current concept can be used for dimensional restoration of engine components and crack repair on low stressed areas in combination with protective coating of engine components.

Mechanical properties and oxidation resistance of welds is given in Tables 2-5.

As follows from test results shown in Table 2 welds produced using Welding Material FM1 comprised 1.6-1.8 wt. % Si without boron additives exhibited the HAZ cracking. However, despite HAZ cracking the silicon bearing weld metal was subjected to rupture testing that confirmed a harmful effect of silicon on creep properties of welds as shown in Table 3.

Welds produced using Welding Material FM2 that comprised of 2.7-3.0 wt. % Si and low amounts of boron were free of cracks and had low mechanical properties. Therefore, Welding Material FM2 can be used mostly for a dimensional restoration of engine components.

Welds that were produced using Welding Alloy FM5 with a high content of boron and silicon were prone to cracking and did not have practical interest.

Welds that were produced using silicon free Welding Material FM11 were free of cracks but due to insufficient boron content of 0.3 wt. %, the HAZ of Inconel 738 and GTD 111 superalloys exhibited micro cracking. Also, boron without silicon reduced oxidation resistance of welds as shown in Table 4.

Figure 9:
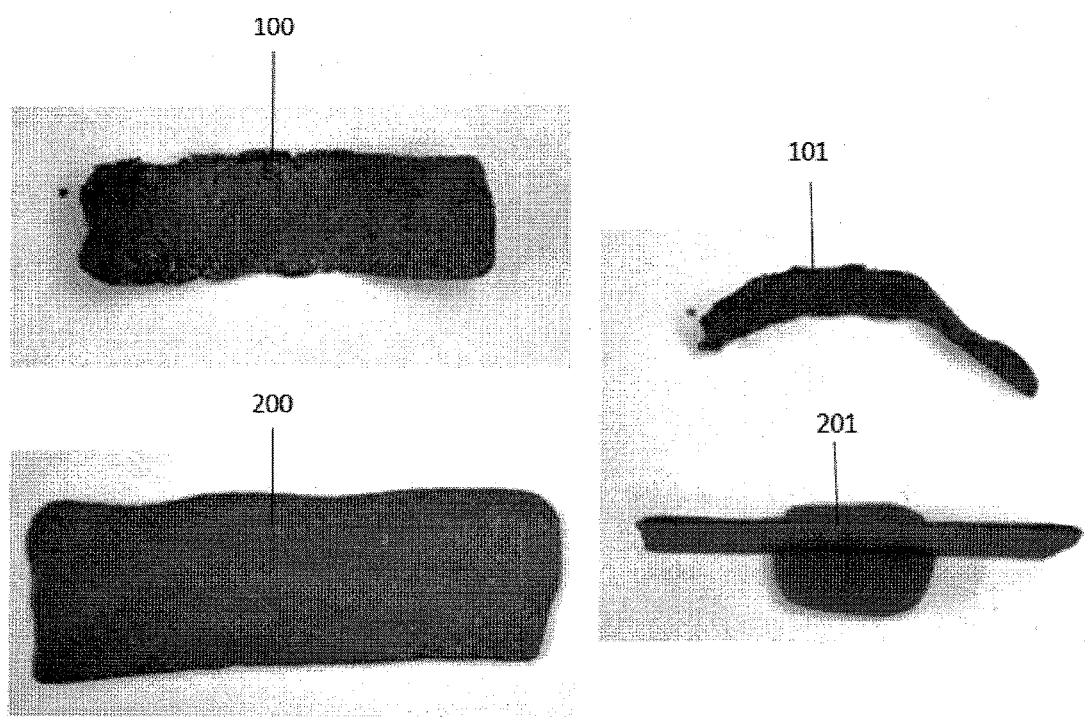
FIG. 9 depicts weld samples produced using GTAW-MA and standard René 80 Welding Material (100 and 101) and Welding Material FM3 (200 and 201), wherein 100 and 200—top view and 101 and 201 side view of samples after testing at a temperature of 2012° F. for 300 hours that depicts a superior oxidation resistance of the weld produced using Welding Material FM4 in the form of welding wire.

Combination of boron, silicon and other alloying elements in Welding Materials FM3, FM4, FM6, FM7, FM8, FM9 and FM10 resulted in a formation sound crack free welds with unique combination of high mechanical and oxidation resistance properties and excluded recrystallization of single crystal CMSX-4 and René N5 single crystal materials in the HAZ shown in FIG. 8-9.

Mechanical properties of welds were improved by a formation of gamma prime phase as shown in FIG. 10 and preferential precipitation of cuboidal borides and silicides within grain matrix as shown in FIG. 5.

Welding with standard René 80 welding alloys on single crystal materials resulted in the recrystallization of the HAZ and cracking of welds produced on high gamma prime GTD 111 superalloys as shown in FIG. 1. Similar cracking was observed on Inconel 738, Mar M247 and René 77 superalloys.

Figure 11:
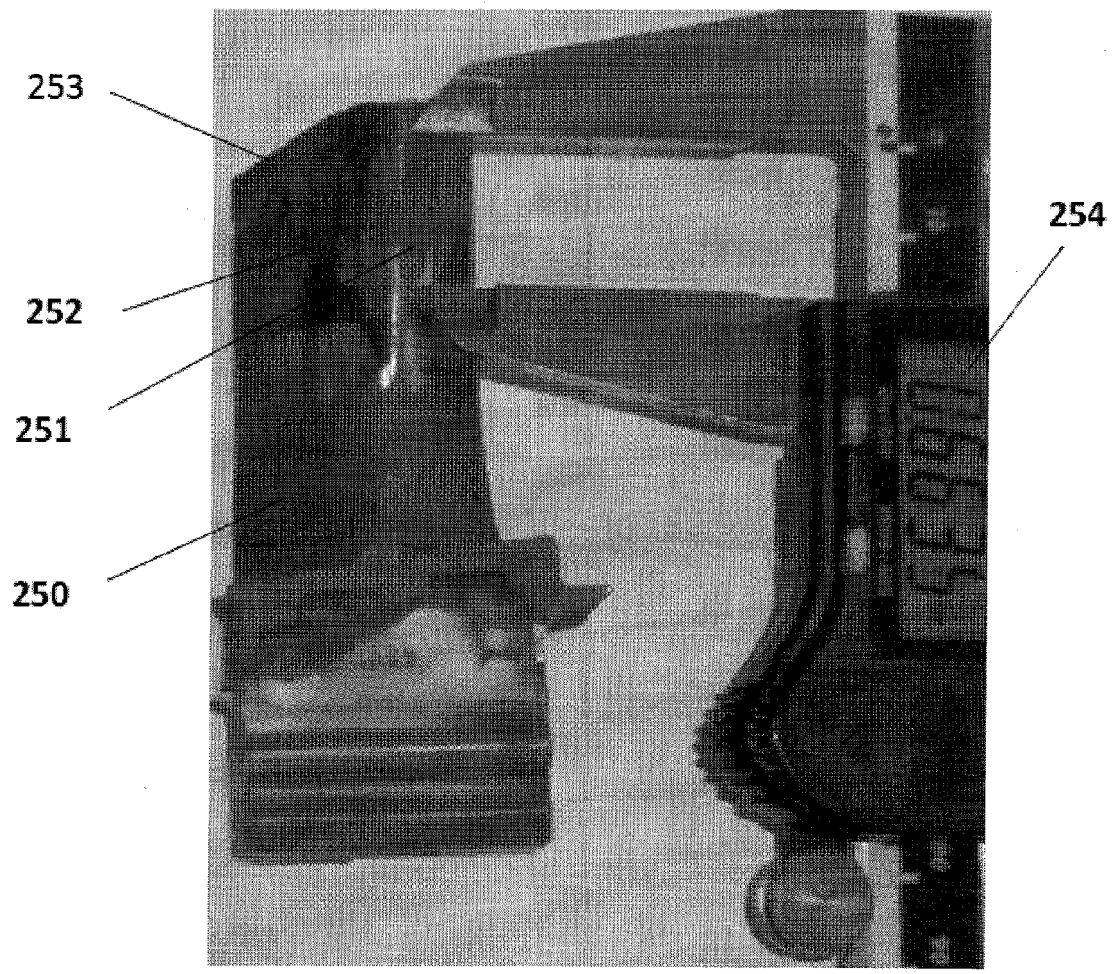
FIG. 11 depicts tip and radial crack repair of the High Pressure Turbine (HPT) blade manufactured of single crystal René N5 superalloy of an aero engine that was produced using GTAW-MA and Welding Material FM7 in the form of welding wire (Weld Example 15), wherein 250—HPT blade, 251 and 252 radial crack welds; 253—tip weld, 254—the calliper that demonstrates the extent of the successful repair of the radial crack.

The demonstration of a practical applicability of developed Welding Materials in the form of welding wire for GTAW-MA and powder for an automatic laser welding is presented by Weld Examples 16 shown in FIG. 11 that demonstrate radial repair of 0.5 inch long crack with welds 251 and 252 of about 066 inch long and tip weld 253. Welding was made at ambient temperature using standard equipment for manual GTAW-MA welding and Welding Material FM7 in the form of welding wire.

After welding the HPT blade was subjected to PWHT stress relief at a temperature of 2050° F., polishing to restore the original geometry of the blade, chemical etching, FPI and radiographic inspection. No unacceptable weld discontinuities were found.

Figure 12:
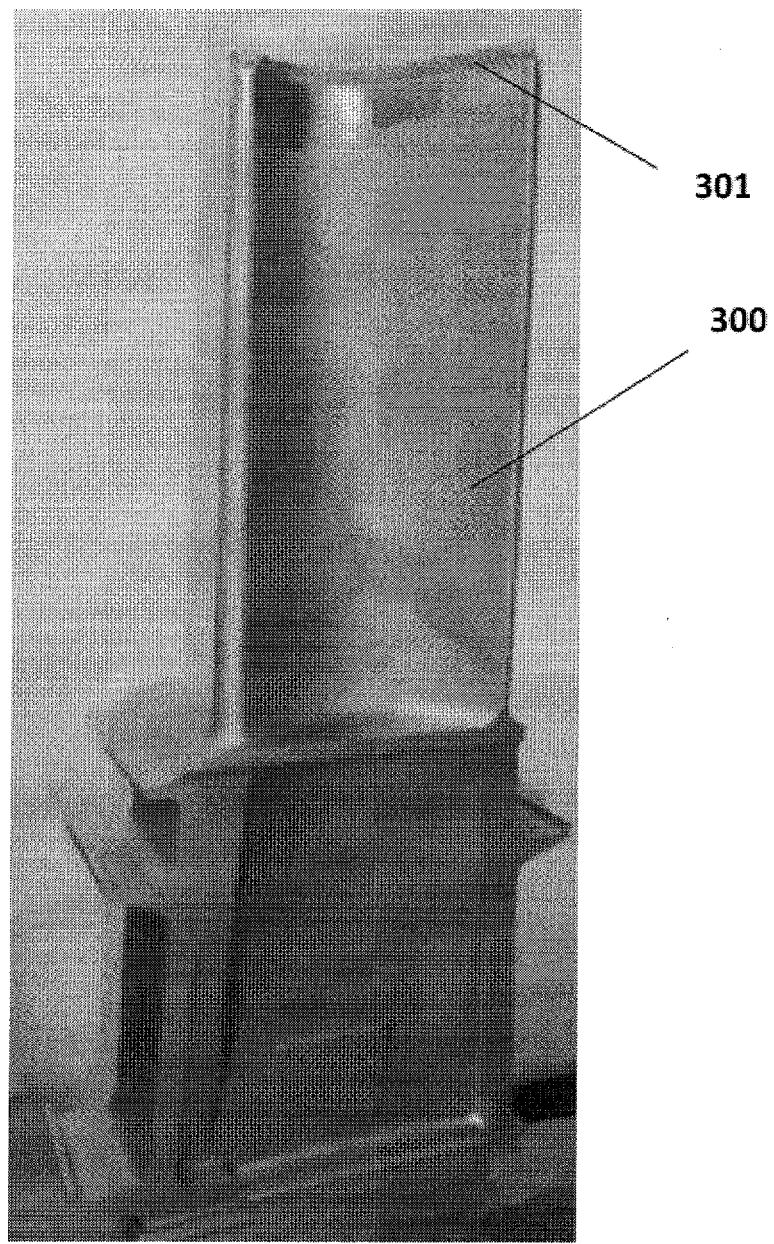
FIG. 12 demonstrates the tip repair of the High Pressure Turbine (HPT) bucket manufactured of GTD111 polycrystalline superalloy of Industrial Gas Turbine Engine using automatic laser cladding and Welding Material FM11 in the form of welding powder (Weld Example 16), wherein 300—HPT bucket, 301—laser weld.

Weld Example 17 shown in FIG. 12 was carried out to demonstrate the tip restoration of the IGT bucket by an automatic multi pass laser cladding at an ambient temperature on the LAWS1000 laser welding system equipped with 1 kW laser using Welding Material FM11 in the form of powder.

After welding the bucket manufactured of GTD 111 superalloy was subjected to post weld standard aging heat treatment, machining, polishing, FPI and radiographic inspection. The weld was acceptable as it achieved all four characteristics described above.

TABLE 1

Chemical Composition of Filler Materials (FM) in Wt. % with Ni and Impurities to Balance

| Example of Welding Materials (FM) | Co | Cr | Mo | W | Al | C | B | Si | Others |
|---|---|---|---|---|---|---|---|---|---|
| Example 1 | 8 | 14 | 3 | 3 | 2 | 0.15 | — | 1.6 | 4-6 Ti, 0.04-0.06 Zr |
| FM1 | 10 | 18 | 5 | 5 | 4 | 0.16 | | 1.8 | |
| Example 2 | 8 | 14 | 3 | 3 | 2 | 0.05 | 0.15 | 2.7 | 2-4 Ti, 0.04-0.06 Zr |
| FM2 | 10 | 18 | 5 | 5 | 4 | 0.1 | 0.18 | 2.8 | |
| Example 3 | 6 | 14 | 2.5 | 2.5 | 2 | 0.05 | 0.10 | 1.2 | 2-4 Ti, 0.04-0.06 Zr |
| FM3 | 8 | 16 | 3.5 | 3.5 | 4 | 0.1 | 0.20 | 1.5 | |
| Example 4 | 8 | 16 | 3.5 | 3.5 | 2 | 0.05 | 0.20 | 1.5 | 2-4 Ti, 0.03-0.06 Zr |
| FM4 | 10 | 18 | 5.0 | 5.0 | 4 | 0.1 | 0.30 | 2.0 | |
| Example 5 | 8 | 14 | 3 | 3 | 2 | 0.08 | 0.40 | 3.0 | 3-6 Ti, 0.03-0.06 Zr |
| FM5 | 10 | 18 | 5 | 5 | 4 | 0.10 | 0.50 | 3.5 | |
| Example 6 | 10 | 6 | 1 | 4 | 6 | 0.13 | 0.01 | 1.6 | 1.6-1.8 Re; 6-7 Ta, |
| FM6 | 12 | 8 | 2 | 5 | 7 | 0.15 | 0.015 | 1.8 | 1-2 Hf, 0.03-0.06 Zr |
| Example 7 | 11 | 7 | 1 | 4 | 5 | 0.13 | 0.10 | 1.8 | 2.0-4.0 Re; 2-4 Ta, |
| FM7 | 13 | 9 | 3 | 6 | 6.5 | 0.15 | 0.15 | 2.0 | 1-2 Hf, 0.03-0.06 Zr |
| Example 8 | 8.5 | 12 | 0.5 | 2 | 4 | 0.14 | 0.30 | 2.0 | 2.2-2.4 Re; 6-7 Ta, |
| FM8 | 9.5 | 14 | 0.8 | 3 | 5 | 0.16 | 0.40 | 2.2 | 1- 2 Hf, 0.03-0.06 Zr |
| Example 9 | 18 | 10 | 9 | — | 1 | 0.1 | 0.20 | 1.6 | 3-3.3 Ti |
| FM9 | 20 | 12 | 11 | | 2 | 0.12 | 0.30 | 1.8 | |
| Example 10 | 9 | 10 | 0.4 | 9 | 4.5 | 0.15 | 0.15 | 1.0 | 0.8-1.2 Ti, 1.2 -1.5 Hf |
| FM10 | 11 | 12 | 0.6 | 11 | 5.5 | 0.17 | 0.20 | 1.2 | 2.5-3.5 Ta |
| Example 11 | 9 | 10 | 0.4 | 9 | 4.5 | 0.15 | 0.25 | — | 0.8 -1.2 Ti, 1.2-1.5 Hf |
| FM11 | 11 | 12 | 0.6 | 11 | 5.5 | 0.17 | 0.30 | | 2.5-3.5 Ta |

TABLE 2

Weld Examples of Crack Susceptibility and Tensile Properties of Laser Clad Welds at a Temperature of 1800° F. Produced on Inconel 738 Substrate Using Welding Materials in Form of Powders

| Weld Example No. | Welding Material | 0.2% Offset Yield Strength, KSI | UTS, KSI | Elong. % | Cracks, Yes/No | Crack Location |
|---|---|---|---|---|---|---|
| 1 | FM1 | — | — | — | Yes | HAZ |
| 2 | FM3 | 38.3 | 50.4 | 14.0 | No | — |
| 3 | FM4 | 37.7 | 51.2 | 11.2 | No | — |
| 4 | FM2 | 22.8 | 28.9 | 9.8 | No | — |
| 5 | FM5 | — | — | — | Yes | WELD |
| 6 | FM6 | 32.2 | 39.8 | 10.8 | No | — |
| 7 | FM8 | 33.8 | 49.2 | 12.8 | No | — |
| 8 | FM9 | 22.8 | 34.5 | 16.0 | No | — |
| 9 | FM11 | — | — | — | Yes | HAZ |
| 10 | René 80 | 39.1 | 51 | 7.8 | Yes | HAZ |

Note: Despite of HAZ cracking clad welds produced using standard René 80 and FM1 filler material were subjected to tensile and rupture testing respectively to obtain the base line data for comparison.

TABLE 3

Rupture Properties of Laser Clad Welds Produced Using Powder Welding Materials

| Welding Material | Test Temperature, °F. | Stresses, KSI | Rupture Time, Hours | Elongation, % |
|---|---|---|---|---|
| FM1 | 1800 | 15 | 2.8 | 9.7 |
| FM4 | 1350 | 67 | 1,000* | — |
| FM4 | 1800 | 15 | 60.5 | 9.0 |
| FM7 | 1350 | 67 | 1,000* | — |
| FM7 | 1800 | 15 | 25.9 | 4.1 |
| FM10 | 1350 | 67 | 1,000* | — |
| FM10 | 1800 | 15 | 30.9 | 5.4 |

Note:
*Testing was discontinued

TABLE 4

Oxidation Resistance of Laser Clad Welds at a Temperature of 1825° F.

| Type of Filler Material That Was Used to Produce Weld | Weight Loss in grams at 1825 ± 15° F. for 820 Hours |
|---|---|
| René 80 | −1.5059 |
| FM11 | −1.6916 |
| FM4 | −0.8622 |

TABLE 5

Oxidation Resistance of Laser Clad Welds at a Temperature of 2050° F.

| Type of Filler Material That Was Used to Produce Weld | Weight Change g/cm² at 2012 ± 15° F. for 300 Hours |
|---|---|
| René 80 | −0.3014 |
| FM4 | −0.1935 |
| FM6 | +0.0953 |

TABLE 5

Mechanical Properties of Butt Joints at a Temperature of 1800° F. Produced Using GTAW-MA with Preferable Welding Materials in the Form of Wire

| Weld Example No. | Base Material | Welding Material | 0.2% Offset Yield Strength, KSI | UTS, KSI | Elong. % | Rupture Test Stresses, KSI | Rupture Time, Hours | Elong. % |
|---|---|---|---|---|---|---|---|---|
| 11 | Inconel 738 | FM3 | 40 | 51.05 | 9.75 | 15 | 78 | 9.5 |
| 12 | René 77 | FM9 | 42.3 | 48.7 | 12 | 15 | 48 | 11.4 |
| 13 | GTD 111 | FM4 | 44.2 | 52.1 | 14.5 | 15 | 92 | 7.8 |
| 14 | Mar M002 | FM10 | 60.95 | 80.95 | 9.35 | 22 | 173.3 | 12 |

The invention claimed is:

1. A precipitation strengthened nickel based welding material for fusion welding of superalloys comprised of the following elements in weight percentages:

| | | |
|---|---|---|
| Cobalt | from about | 8 to 10 wt. % |
| Chromium | from about | 14 to 18 wt. % |
| Molybdenum | from about | 3 to 5 wt. % |
| Tungsten | from about | 3 to 5 wt. % |
| Titanium | from about | 3 to 6 wt. % |
| Zirconium | from about | 0.04 to 0.06 wt. % |
| Aluminum | from about | 1 to 6 wt. % |
| Carbon | from about | 0.05 to 0.2 wt. % |
| Boron | from about | 0.015 to 0.4 wt. % |
| Silicon | from about | 1 to 3 wt. % |

Selected from among Titanium, Zirconium, Hafnium, Tantalum and Rhenium from about 1 to 18 combined total wt. %, and Nickel with impurities to balance.

2. A precipitation strengthened nickel based welding material for fusion welding of superalloys comprised of the following elements in weight percentages:

| | | |
|---|---|---|
| Cobalt | from about | 5 to 15 wt. % |
| Chromium | from about | 5 to 25 wt. % |
| Aluminum | from about | 1 to 6 wt. % |
| Carbon | from about | 0.05 to 0.2 wt. % |
| Boron | from about | 0.015 to 0.4 wt. % |
| Silicon | from about | 1 to 3 wt. % |

Selected from among Tungsten and Molybdenum from about 1 to 20 wt. %

Selected from among Titanium, Zirconium, Hafnium, Tantalum and Rhenium from about 1 to 18 combined total wt. %, and Nickel with impurities to balance is a welding powder.

* * * * *